United States Patent
Estrop et al.

(10) Patent No.: US 8,687,120 B2
(45) Date of Patent: *Apr. 1, 2014

(54) HIGH DEFINITION MEDIA CONTENT PROCESSING

(75) Inventors: Stephen Estrop, Carnation, WA (US); Matthew C. Howard, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/421,557

(22) Filed: Mar. 15, 2012

(65) Prior Publication Data
US 2012/0176545 A1   Jul. 12, 2012

Related U.S. Application Data

(63) Continuation of application No. 11/935,519, filed on Nov. 6, 2007, now Pat. No. 8,174,620.

(51) Int. Cl.
H04N 5/44 (2011.01)

(52) U.S. Cl.
USPC ........... 348/559; 348/598; 348/590; 348/592; 348/596; 348/501

(58) Field of Classification Search
USPC ........... 348/599, 598, 590, 592, 596; 345/501
See application file for complete search history.

(56) References Cited

U.S. PATENT DOCUMENTS

| | | | |
|---|---|---|---|
| 5,227,863 A | 7/1993 | Bilbrey | |
| 6,028,611 A | 2/2000 | Anderson | |
| 6,750,944 B2 | 6/2004 | Silverbrook | |
| 6,806,903 B1 | 10/2004 | Okisu | |
| 6,842,177 B2 | 1/2005 | Garg | |
| 7,023,487 B1 | 4/2006 | Adams | |
| 7,086,013 B2 | 8/2006 | Saund | |
| 7,158,141 B2 | 1/2007 | Chung | |
| 7,274,369 B1 | 9/2007 | Bastos | |
| 8,174,620 B2 | 5/2012 | Estrop | |
| 2005/0024363 A1 | 2/2005 | Estrop | |
| 2007/0098368 A1 | 5/2007 | Carley | |

(Continued)

OTHER PUBLICATIONS

"Non-Final Office Action", U.S. Appl. No. 11/935,519, (Aug. 29, 2011), 6 pages.

(Continued)

*Primary Examiner* — Jefferey Harold
*Assistant Examiner* — Mustafizur Rahman
(74) *Attorney, Agent, or Firm* — Carole Boelitz; Micky Minhas; Wolfe-SBMC

(57) ABSTRACT

High definition media content processing techniques are described in which enhanced media content rendering techniques may be performed to output high definition media content. In an implementation, luma keying may be provided to define clear pixels in a composite output using an optimum set of graphics processing instructions. In another implementation, techniques are described which may provide clear rectangles in a composite output of one or more video streams. Clear rectangles to appear in the composite output are configured by a media playback application. A texture is arrived at to represent a union of each of the clear rectangles and is applied to form the clear rectangles in the composite output. In another implementation, capture techniques are described in which an image to capture is resolved as strips to an intermediate texture and then from the texture to a capture buffer in system memory.

20 Claims, 7 Drawing Sheets

(56) References Cited

U.S. PATENT DOCUMENTS

| | | | |
|---|---|---|---|
| 2007/0211174 A1* | 9/2007 | Putterman et al. | 348/588 |
| 2007/0217518 A1 | 9/2007 | Valmiki | |
| 2007/0223877 A1 | 9/2007 | Kuno | |
| 2008/0104202 A1* | 5/2008 | Barrett et al. | 709/219 |
| 2008/0303747 A1* | 12/2008 | Velicescu | 345/1.3 |
| 2009/0115905 A1 | 5/2009 | Estrop | |
| 2009/0310023 A1* | 12/2009 | Nakayama | 348/584 |
| 2012/0172124 A1 | 7/2012 | Estrop | |

OTHER PUBLICATIONS

"Notice of Allowance", U.S. Appl. No. 11/935,519, (Feb. 6, 2012),7 pages.

"OEM Guide", http://www.leitch.com/pdfs/dps_OEM_Guides/Altitude-OEM-Guide.pdf, (Sep. 25, 2005),21 Pages.

"Video Editing Cards", http://www.planetdv.net/Content/Video_Editing_Cards/, (Oct. 12, 2007), 2 Pages.

Curtis, "Sirius Video Programming and Configuration Guide", http://techpubs.sgi.com/library/manuals/2000/007-2238-003/pdf/007-2238-003.pdf, (Oct. 1, 1994),211 Pages.

* cited by examiner

HIGH DEFINITION MEDIA CONTENT PROCESSING

PRIORITY

This application is a continuation of and claims priority under 35 U.S.C. §120 to application Ser. No. 11/935,519 filed on Nov. 6, 2007 and titled "High Definition Media Content Processing," the disclosure of which is incorporated by reference herein in its entirety.

BACKGROUND

Options that are available to users for media content are ever increasing. For example, more and more media content is available in high definition resolutions. Devices such as televisions and optical disk playback devices supporting high definition media content are increasingly in demand.

However, traditional techniques to render media content on such devices may not be suitable for high definition media content due to increased processing demands to handle the higher resolution. For example, each frame of high definition video content may contain over two million individual pixels to process for output. Thus, traditional techniques developed to handle fewer pixels may overburden processing resources when applied to processing of high definition media content. This may result in a variety of detrimental effects which detract from the user experience, such as slow processing, "choppy" playback, incorrect or incomplete processing and so forth.

SUMMARY

High definition media content processing techniques are described in which a one or more modules may perform enhanced rendering techniques to output high definition and/or other media content. In an implementation, luma keying is provided using an optimum set of graphics processing instructions. Luma keying may be performed on a pixel-by-pixel basis to cause select pixels of a composite output to appear transparent. For each pixel, a maximum value is arrived at as the greater of a pixel's luma value minus a high threshold value and a low threshold value minus the pixel's luma value. When the maximum value for a respective pixel is less than zero, the respective pixel is made to appear transparent.

In another implementation, techniques are described to provide clear rectangles in a composite output of one or more video streams. Clear rectangles (e.g., transparent areas) to appear in the composite output are configured. A texture is arrived at which represents a union of each of the clear rectangles. The texture is applied on a pixel-by-pixel basis to form the clear rectangles in the composite output. The texture arrived at may be applied to successive frames of the composite output until a change is made to the clear rectangles. When a change occurs, a new texture is formed and applied.

In another implementation, capture techniques are described to provide video capture of a main video stream in a composite output of one or more video streams. An application may allocate a capture buffer in system memory responsive to receiving a capture request. An image of the main video stream may be captured from a back buffer used to composite the one or more video streams. This capture may occur after processing of the main video stream and before compositing of sub-streams on the main video stream. Access to the back buffer may be restricted to a graphics processor, thus a texture available to the graphics processor and the module is employed to copy the image to the capture buffer. To capture the image, the image of the main video stream is resolved into multiple strips. Each strip is copied to the texture and then from the texture to the capture buffer system memory. The strips are reconstructed in the capture buffer to form the captured image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
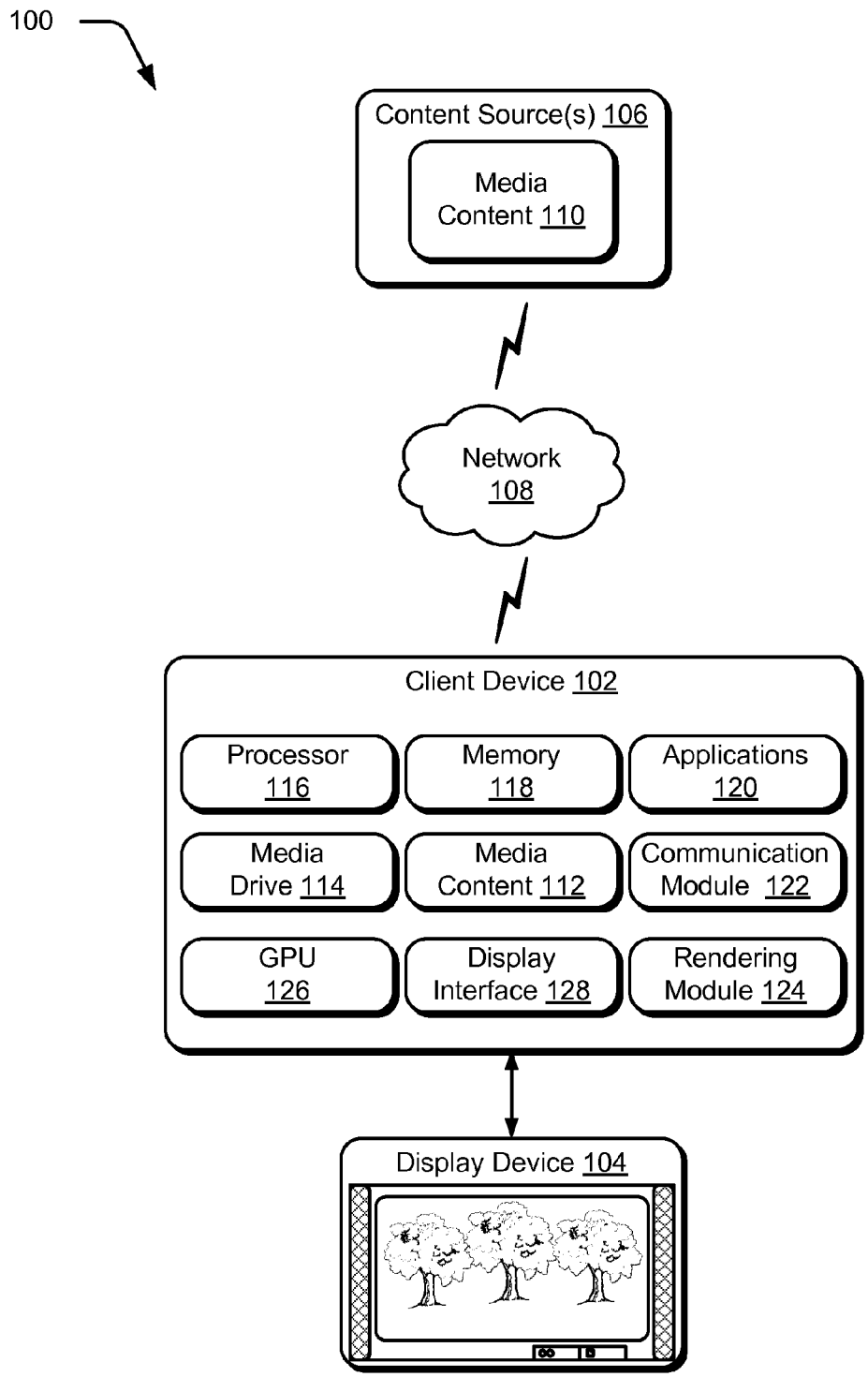
FIG. 1 is an illustration of an environment in an exemplary implementation that is operable to employ high definition media content processing techniques.

Options that are available to users for media content are ever increasing. For example, more and more media content is available in high definition resolutions. Devices such as televisions and optical disk playback devices supporting high definition media content are increasingly in demand. However, traditional techniques to render media content on such devices may not be suitable for high definition media content due to increased processing demands to handle the higher resolution.

High definition media content processing techniques are described in which one or more modules may perform enhanced rendering techniques to output high definition media content, as well as other media content. In an implementation, luma keying (in which transparent region of composite output may be specified) is provided using an optimum set of graphics processing instructions. For instance, a client device may include a rendering application which provides instructions to implement luma keying on a graphics processing unit. The rendering application may instruct the graphics processing unit to determine a maximum value as the greater of a pixel's luma value minus a high threshold and a low threshold minus the pixel's luma value. When the maximum value for a respective pixel is less than zero, the graphics processing unit (under the influence of the rendering application) may set the respective pixel to appear transparent in the composite output.

In another implementation, techniques are described to provide clear rectangles (e.g., transparent rectangular regions) in a composite output of one or more video streams. Clear rectangles permit regions of one content stream to appear through another, such as to expose a main video stream through a menu or subtitle stream. Clear rectangles which are to appear in the composite output are configured, for example by a media playback application of a client device. Attributes defining the clear rectangles may be passed by the media playback application in a content stream to a rendering application. The rendering application may use these attributes to form a texture representing a union of each of the clear rectangles. A graphics processing unit (GPU) under the influence of the rendering application may apply the texture on a pixel-by-pixel basis to the video streams to form the clear rectangles in the composite output. The texture may be set up initially and then may be applied to successive frames of the composite output until a change is made to the clear rectangles. When a change occurs, a new texture may be formed and applied. Thus, additional processing involved in forming the textures over and over may be avoided.

In another implementation, capture techniques are described to provide video capture of a main video stream in a composite output of one or more video streams. An console application of a game console may allocate a capture buffer in system memory responsive to receiving a capture request. For example, a viewer of a movie played back via the game console may initiate a request to capture an image from the movie. A capture module may provide an interface to capture an image of the main video stream of the movie from a back buffer used to composite one or more video streams for an output of the movie. To provide an image of a main video stream without sub streams, menus, overlays and so forth, the capture may occur after processing of the main video stream and before compositing of sub-streams on the main video stream.

Access to the back buffer may be limited to a graphics processing unit (GPU) of the game console. Thus, an intermediate texture (allocated in memory available to the GPU and the console application and executeable by a processor of the game console) may be used to copy the image to the capture buffer. To reduce the size of the texture, the image of the main video stream may be resolved into a multiple strips which are smaller than the overall image. Each strip may be copied to the texture by the GPU and then by the console application or capture module from the texture to the capture buffer system memory. This permits a relatively small texture to be used to perform the capture.

In the following discussion, an exemplary environment is first described that is operable to perform high definition media content processing techniques. Exemplary procedures are then described that may be employed in the exemplary environment, as well as in other environments. Although these techniques are described as employed within a media processing environment in the following discussion, it should be readily apparent that these techniques may be incorporated within a variety of environments without departing from the spirit and scope thereof.

Exemplary Environment

FIG. 1 is an illustration of an environment 100 in an exemplary implementation that is operable to employ high definition media content processing techniques described herein. The illustrated environment 100 includes a client device 102 and a display device 104. Client device 102 is illustrated as connected to one or more content sources 106 via a network 108. Network 108 may be representative of one or more networks through which content sources 106 may be available including but not limited to an intranet, the Internet, a broadcast network, a wireless network, a satellite network, and so forth.

Client device 102 may be configured in a variety of ways. For example, client device 102 may be configured as a computer that is capable of communicating over the network 108, such as a desktop computer, a mobile station, an entertainment appliance, a set-top box communicatively coupled to a display device as illustrated, a wireless phone, and so forth. Client device 102 may also be configured a game console, further discussion of which may be found in reference to FIG. 2.

Client device 102 may interact via the network 108 to select and receive media content 110 available from the content sources 106. For example, client device 102 is depicted as having media content 112 which may include media content 112 received via the network 108. Media content 110 provided by the content sources 106 via the network 108 may be accessed by the client device 102 for streaming playback, storage on the client device 102, and so forth.

Media content 112 may also be obtained locally by the client device 102, such a being stored in memory 118 and/or provided from various computer-readable media sources. A variety of computer-readable media is contemplated including floppy disk, optical disks such as compact discs (CDs) and digital video disks (DVDs), a hard disk, and so forth. For example, client device 102 is illustrated a including a media drive 114 through which media content 112 may be accessed for execution, playback from the media drive and/or storage in memory 118.

In an implementation, media drive 114 may be configured as an optical disk drive to read optical disks holding data according to various standards and formats. Examples of optical disk formats suitable for a media drive 114 include but are not limited to CD-ROM, DVD, and high definition optical disk formats such as HD-DVD (e.g., HD-DVD developed by the DVD Forum) and BLU-RAY (e.g., Blu-ray Disc format developed by the Blu-ray Disc Association (BDA)). Other types and formats for media drive 114 and corresponding computer-readable media are also contemplated. While media drive 114 may be an internal drive as illustrated, media drive 114 may alternatively be configured as an external drive communicatively coupled to the client via a media interface. Further, a client device 102 may include multiple media drives 114 each configured to read data in different associated formats.

Media content 112 is representative of a variety of different types of content, including but not limited to: video programs, television programs, music, applications, games, internet pages, streaming video and audio, and so forth. In an implementation, at least some of the media content 112 of client device 102 is high definition content, such as high definition video programs, movies, television programs, games and so forth. Examples of high definition content formats include content having resolutions of 720$p$, 1080$i$ and 1080$p$ content. Media content 112 in high definition formats may be available via the media drive 114 reading optical disks, from storage in memory 118 and/or from content sources 106 over the network 108.

While certain examples and techniques may be described herein with respect to media content 112 in a high definition format, it is contemplated that the techniques may be employed to enhance processing of other content formats, including media content 112 which is not considered high definition. Accordingly, the described techniques may be employed to process media content 112 configured in various formats, alone or in combinations thereof. For example, different content streams having different formats can be composited into an output, such as in a picture-in-picture (PIP) or picture-by-picture (PBP) presentation.

Client device 102 also includes a processor 116, memory 118 and applications 120 which may be stored in the memory 118 and executed via the processor 116. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 118 is shown for the client device 102, a wide variety of types and combinations of memory may be employed, such as random access memory (RAM), hard disk memory, video memory, texture memory, removable medium memory, and other types of computer-readable media.

Client device 102 may include various applications 120 to provide functionality of the client device 102. Applications 120 provide with a client device 102 may include but are not limited to: operating system software, utility software, a browser application, an electronic programming guide (EPG) application, office productivity programs, game programs, media management software, a media playback application, and so forth. A variety of other applications 120 are also contemplated.

In the depicted example, client device 102 also includes a communication module 122 and a rendering module 124. Communication module 122 represents functionality to interact with content sources 106 via the network 108. In particular, the communication module 122 may represent functionality to search, obtain, process, manage and initiate output of media content 110 and/or other data that may be available from the content sources 106.

Rendering module 124 is representative of a variety of functionality to process media content 112 at the client device 102, such as display of media content 112 on the display device 104. In particular, rendering module 124 may be executed to composite multiple video streams into a composite output and to render the composite output in synch with a presentation clock. Rendering module 124 may be implemented as a component of operating system software. In another example, rendering module 124 may be implemented as a component of an application 120 configured as a media playback application to manage and control playback of media content 112 on the client device 102. Rendering module 124 may also be a stand-alone application that operates in conjunction with the operating system and/or a media playback application to output media content 112 for display on the display device 104. A variety of applications 120 of a client device 102 may interact with and utilize the features of the rendering module 124 to output media content 112.

In an implementation, rendering module 124 may be operable to output content 112 that is configured in accordance with one or more HD-DVD specifications (e.g., HD-DVD Specification version 1.0 promulgated by the DVD Forum). The one or more HD-DVD specifications specify the inclusion of techniques for luma keying, clear rectangle, and image capture related to playback of HD-DVD content without specifying details as to how the techniques are to be implemented. Accordingly, in this context rendering module 124 may be further configured to implement techniques for luma keying, clear rectangles, and image capture further discussion of which may be found in reference to FIG. 2 and the following figures. While the described techniques may be applicable to implement aspects of one or more HD-DVD specifications, it is contemplated that the described techniques for luma keying, clear rectangles and image capture are not limited to implementing HD-DVD specifications, but rather are applicable to rendering media content 112 of a variety of types and formats.

Client device 102 also includes a graphics processing unit (GPU) 126 that is representative of various processing functionality of the client device 102 which may be dedicated to graphics processing. Functionality provided by the GPU 126 may include controlling aspects of resolution, pixel shading operations, color depth, texture mapping, and other tasks associated with rendering images such as bitmap transfers and painting, window resizing and repositioning, line drawing, font scaling polygon drawing, and so on. The GPU 126 may be capable of handling these processing tasks in hardware at greater speeds than the software executed on the processor 116. Thus, the dedicated processing capability of the GPU 126 may reduce the workload of the processor 116 and free up system resources for other tasks. In an implementation, GPU 126 may be operated under the influence of the rendering module 124 to perform the various processing functions. For instance, rendering module 124 may be configured to provide instructions to direct the operation of the GPU 126, including processing tasks involved in techniques for luma keying, clear rectangles and image capture.

Results of the processing by rendering module 124 and/or GPU 126 may be output for display on the display device 104. Client device 102 includes a display interface 128 through which rendered media content may be displayed on a display device 104. Display interface 128 may incorporate a digital to analog converter (DAC), digital video interface (DVI) outputs and/or other components to convert the rendered media content 112 into a form understandable by the display device 104.

Generally, the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide high definition media content processing are platform independent, meaning that the techniques may be implemented on a variety of commercial computing platforms having a variety of processors.

Figure 2:
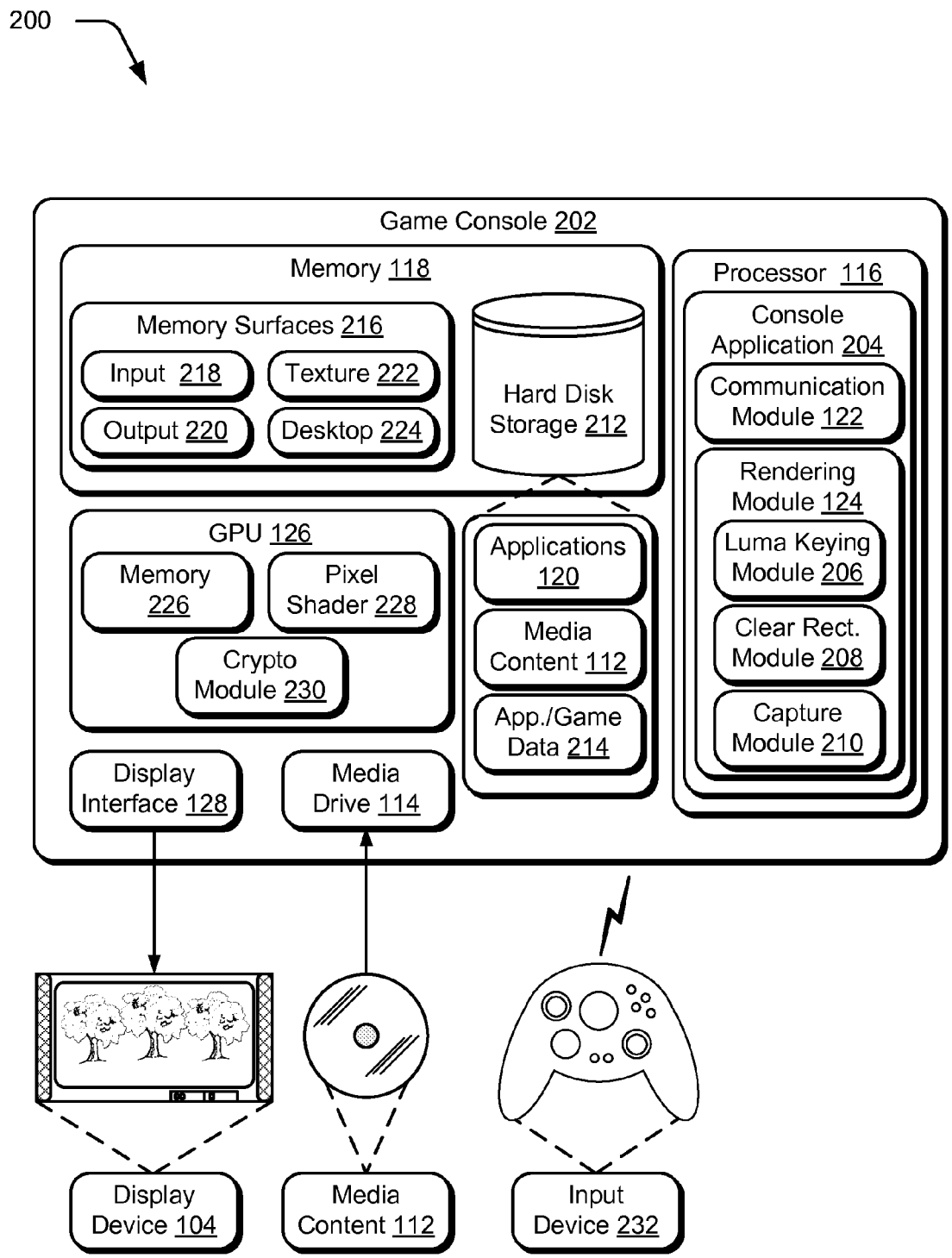
FIG. 2 is an illustration depicting an example of a client device described in FIG. 1 in greater detail.

FIG. 2 is an illustration of an embodiment of an exemplary device 200 illustrating aspects of the client device 102 of FIG. 1 in greater detail. In the depicted example, the client device 102 of FIG. 1 is illustrated as a game console 202. Game console 202 may provide a variety of gaming interactions, such as playback of game discs, and network gaming sessions, as well as other interactions with media content 112. The game console 202 is illustrated as having a media drive 114, processor 116, memory 118, graphics processing unit 126 and display interface 128 coupled to a display device 104, as discussed in relation to FIG. 1.

The processor 116 is illustrated as executing a console application 204. The console application 204 provides a consistent user interface and navigation features to move users through various entertainment areas. The console application 204 offers a convenient way to access content from multiple different types of media content 112 (e.g., game data, audio data, Internet data; video data and so forth) regardless of the media type which is accessed from the media drive 114, memory 118, or from a other content sources 106 of FIG. 1. When the game console 202 is powered on, the console application 204 may be executed on the processor 116. The console application 204 presents a graphical user interface that provides a consistent user experience when navigating to interact with different media content 112 on the game console 202. The console application 204 thus provides integrated functionality to access, manage, store and interact with media content 112 of the game console 202. As illustrated, the console application 204 may include the communication module 122 and rendering module 124 of FIG. 1 as components thereof.

As noted, rendering module 124 may include functionality to perform techniques related to luma keying, clear rectangle, and image capture. In the example depicted in FIG. 2, rendering module 124 includes a luma keying module 206 representative of functionality executable to implement luma keying techniques, further discussion of which may be found in reference to FIG. 3. Rendering module 124 is also illustrated as including a clear rectangle module 208 representative of functionality executable to implement clear rectangle techniques, further discussion of which may be found in reference to FIGS. 4-6. Rendering module 124 also is illustrated as including a capture module 208 representative of functionality executable to implement image capture techniques, further discussion of which may be found in reference to FIG. 7.

As noted, memory 118 may be representative of various types of memory that may be included with a game console 202, such as random access memory (RAM), read only memory (ROM), system memory, video memory (VRAM), hard disk storage and so forth. Memory 118 of the example game console 202 of FIG. 2 includes hard disk storage 212, which may store a variety of different data, examples of which include but are not limited to: applications 120, media content 112, and various application/game data 214, as illustrated in FIG. 2.

Memory 118 may also includes various memory surfaces 216 which may be arranged to perform rendering of media content 112. For instance, the rendering module 124 may arrange and manage various memory surfaces 216 to be used in performance of graphics processing operations. Examples of memory surfaces 216 include input 218 and output 220 memory surfaces, which may be arranged to hold/sequence input data for processing tasks performed on media content 112 tasks and to store the results of processing tasks for additional processing and/or output. The input 218 and output 220 memory surfaces may also be representative of various buffers used in the processing of media content 112, including the capture buffer and back buffer discussed in relation to FIG. 7.

Memory surfaces 216 of FIG. 2 are also illustrated as having a texture 222. The illustrated texture 222 is representative of one or more textures which may be stored within memory 118 or other suitable memory. The texture 222 may be configured as a bit map indicative of various characteristics such as color, transparency, shading and so forth. Texture 222 may configured to be employed to represent a union of clear rectangles as discussed in relation to FIG. 4-6. Another texture 222 may be used to implement image capture techniques discussed in relation to FIG. 7. Texture 222 may be formed in memory 118 and may be applied repeatedly during iterative processing tasks.

Further, memory surfaces 216 may include a desktop 224 surface to which processed data ready for display on the display device 104 may be written. For example rendering module 124 may manage sequencing of writing frame data to the desktop 224 surface, which may then be rendered via display interface 128 for presentation on the display device 104.

GPU 126 may also include memory 226 which is dedicated to processing task of the GPU 126 and may be accessible to the GPU 126 alone for security purposes. It is noted that while the various memory surfaces 216 are depicted in FIG. 2 as arranged in memory 118 (e.g., system memory), the memory surfaces 216 may be arranged in various combinations among memory 118, memory 226 of the GPU 126 and/or other suitable memory. Thus, high definition media content processing techniques described herein portions may involve portions of memory 118 dedicated to the game console 202 (e.g., dedicated system memory), portions of memory 118 shared by the system and GPU 126 (e.g., shared VRAM), and portions of memory 226 of the GPU 126 dedicated to the GPU 126.

Further, cryptographic techniques may be employed to operate on and secure protected content. For instance, game console 202 may also include a cryptographic module 228, which in the example of FIG. 2 is illustrated as a component of the GPU 126. Cryptographic module 228 may also be implemented in hardware and/or software as a standalone component of the game console 202. Cryptographic module 228 is representative of functionality to perform various secure encoding and decoding operations to secure various memory portions and implement security measures when rendering media content 112, such as to prevent piracy of protected media content.

GPU 126 is also illustrated as having a pixel shader 230. The pixel shader 230 is representative of functionality to perform various pixel-by-pixel operations on media content 112 rendered via the GPU 126. In an implementation, pixel shader 230 is operated under the influence of the rendering module 124, through processing instructions from the rendering module 124 to control the GPU 126. Pixel shader 230 may be operated to implement aspects of techniques for luma keying and clear rectangles, further discussion of which may be found in relation to FIG. 3 and FIGS. 4-6 respectively.

An input device 232 is also illustrated which is representative of a device that may be manipulated by a user to form inputs to operate the game console 202. For instance, input device 232 may be manipulated to provide various inputs to navigate the console application 204, select media content 112, play games, and so forth. Input device 232 may be configured as game controller as illustrated in FIG. 2. A variety of other input devices are also contemplated for use with the game console 202 and/or the client device 102 of FIG. 1, such as a mouse, keyboard, trackball and so forth.

Exemplary Procedures

The following discussion describes techniques related to high definition media content processing that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the exemplary environment 100 of FIG. 1 and the device 200 of FIG. 2.

Luma Keying

Luma keying allows content authors specify transparent regions within a composite output of multiple content substreams while using a compact video format. The multiple content streams may include for example main video, sub video, menu overlays, graphics overlays, text overlays, and so forth, which are layered one over another to produce the composite output. In particular, the luma keying techniques may be implemented without using a separate alpha channel in the content stream data to contain transparency data.

Rather, upper and lower limits for luma (e.g., brightness) are established for a content stream. In processing the content stream, calculations are performed to check the luma value of each pixel to be output against the upper and lower limits. When it is determined that the luma for a particular pixel falls within the upper and lower limits, then that pixel is made transparent.

Figure 3:
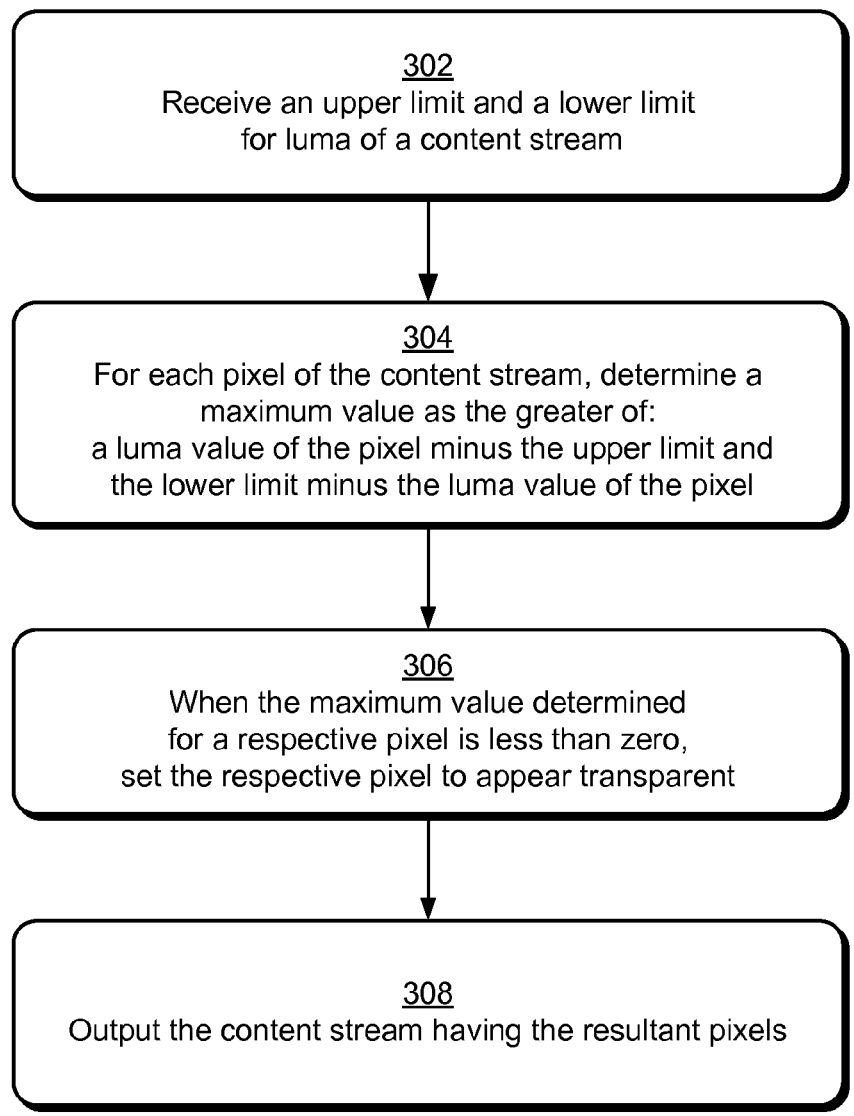
FIG. 3 is a flow diagram depicting a procedure in an exemplary implementation of luma keying for composite output of one or more video streams.

Referring to FIG. 3, a procedure 300 is depicted in an exemplary implementation in which luma keying is performed for media content rendering by a client device. An upper limit and a lower limit for luma of a content stream are received (block 302). For example, playback of media content 112 from an optical disk inserted in the media drive 114 of game console 202 may be initiated through interactions with the console application 204. For the purposes of example, assume the optical disk contains a movie in HD-DVD format. Rendering module 124 may be executed to render the movie for output on the display device 104. Rendering module 124 processes data for the movie from the optical disk which may include multiple content streams to be composited to form the composite output. Luma keying module 206 may be executed to cause luma keying to be performed on the composited streams.

Luma keying may be configured by including and setting attributes related to luma keying for each content stream. The attributes may contain a structure that specifies whether or not luma keying is enabled for the stream and an upper and lower luma limit for the content stream. The upper limit and lower limit for luma may be extracted by the luma keying module 206 from the content and passed to the GPU 126 along with instructions to initialize processing of pixels of the content stream. If the attributes indicate that luma keying is disabled, then luma keying processing for the content stream may be bypassed. It is noted that the attributes, including the upper limit and lower limit for luma, may be set by a content author to change for each frame of a content stream and/or set to remain the same for a sequence of frames. This provides content authors a great amount of flexibility in setting the attributes to use luma keying techniques described herein. GPU 126 receives the limits and processing instructions and performs the processing specified by the instructions.

For each pixel of the content stream, a maximum value is determined as the greater of a luma value of the pixel minus the upper limit and the lower limit minus the luma value of the pixel (block 304). When the maximum value determined for a respective pixel is less than zero, the respective pixel is set to appear transparent (block 306).

For example, the instructions from the luma keying module 206 may be performed as part of operations of the pixel shader 230 component of the GPU 126. The pixel shader 230 under the influence of rendering module 124 and/or luma keying module 206 performs a variety of processing on a pixel-by-pixel basis. In particular, the pixel shader 230 may operate on each pixel in each frame of the content stream. For high definition content, such as content having a resolution of 1920×1080 pixels, this may equate to processing of two million plus pixels per frame. Further, because multiple content streams may be composited to form a composite output, the number of pixels processed for a frame of the composite output may equate to two million plus pixels times the number of content streams.

Accordingly, performance gains may be achieved by optimizing the number of processing instructions performed and/or avoiding branches in the execution of the processing instructions. Thus, the luma keying techniques herein may be implemented using relatively few processing instructions within the rendering module 124 or luma keying module 206 to cause operations by the pixel shader 230. Further, the processing instructions to implement luma keying may be configured to avoid using branch instructions since using branch instructions may introduce overhead of several instructions per pixel processed.

In an implementation, performance is achieved by implementing luma keying using relatively few processing instructions. Accordingly, these processing instructions may be executed relatively quickly by the GPU 126 and/or pixel shader 230. In one or more embodiments, about four or fewer processing instructions are used to cause the pixel shader 230 for each pixel to:

Subtract the upper limit from the pixel's luma value.
Subtract the pixel's luma value from the lower threshold.
Determine a maximum value from the above calculations.
When the maximum is less than zero, then the luma keying is active and the pixel is made transparent.

If the maximum is not less than zero, then the pixel's transparency is not changed, e.g., the pixel is not operated upon to change the transparency.

In an implementation, processing instructions used for the described luma keying techniques may be configured as assembly language instructions that are performable by the pixel shader 230. An example of such assembly language instructions is provided as follows:

```
// Luma Key the Y channel
// constant c11 is the upper bound
// constant c10 is the lower bound
// r0 contains the input pixel data
// r1 is used to return the output pixel data
// r3, r4, and r5 are temporary variables
sub r3.x, r0.x, c11.x        // r3.x = r0.x − upper.x
sub r4.x, c10.x, r0.x        // r4.x = lower.x − r0.x
max r5.x, r3.x, r4.x         // r5.x = max(r3.x, r4.x)
cmp r1.a, r5.x, r0.a, c0.a   // r1.a = (r5.x >= 0) ? r0.a: 0
```

The preceding example is but one example of processing instructions that may be used to implement the described luma keying techniques. A variety of other examples of processing instructions to implement luma keying techniques are also contemplated.

The content stream having the resultant pixels is output (block 308). For example, the rendering module 124 may output the HD-DVD movie on the display device 104 of FIG. 2 having clear pixels that are the result of luma keying processing by the GPU 126 and/or pixel shader 230. In this manner, luma keying may be implemented to include transparent regions within a composite output of multiple content sub-streams.

Clear Rectangle

Clear rectangle allows content authors to specify rectangular regions in content streams of a composite output to be made transparent so that an underlying content stream is visible in the composite output. Multiple clear rectangles may be specified. In an implementation, up to 32 simultaneous clear rectangles may be supported. Further, each clear rectangle may span multiple content streams, may overlap with other clear rectangles, and can have different target z-depths.

Z-depth as used herein refers to the relative position of content streams one to another in a composite output. A main content or video stream may have a z-depth of zero. In creating the composite output, a stream of zero z-depth may be composited first, e.g., on the "bottom". Additional content streams may be layered on top of the "bottom" stream on the basis of respective z-depths. For instance, the rendering module 124 may be configured to composite streams in order from lowest to highest z-depth. Thus, z-depth one is rendered above z-depth zero, z-depth two is rendered above z-depth one, and so on.

In relation to clear rectangles, target z-depth indicates which layers or streams the clear rectangle penetrates. For example, a clear rectangle may be defined to begin at a z-depth of two and extend to a z-depth of one. Thus, an underlying stream of z-depth one will be exposed by the example clear rectangle. However, a stream of z-depth three will cover the clear rectangle and the underlying stream, since the example clear rectangle does not extend through z-depth three.

Figure 4:
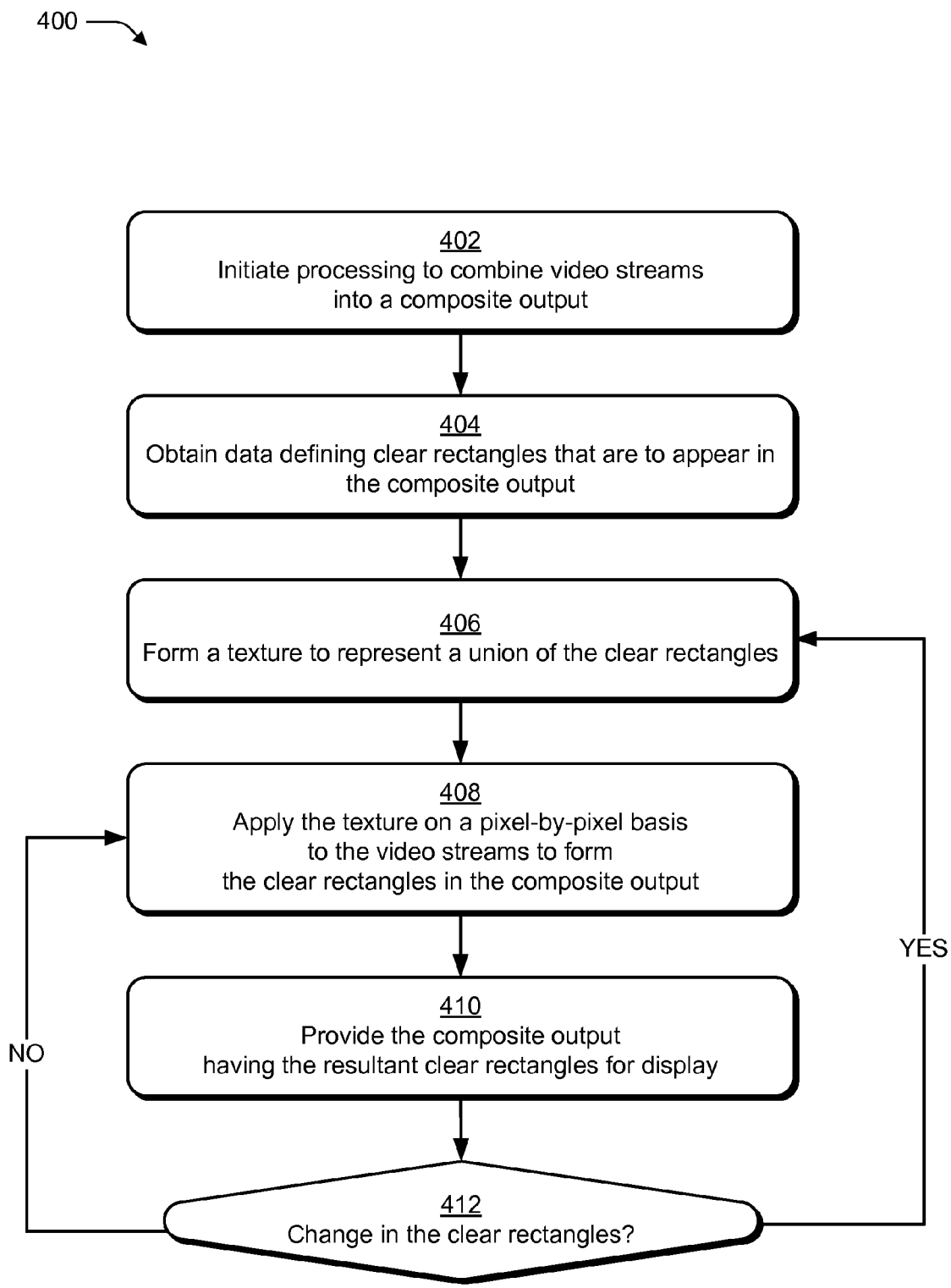
FIG. 4 is a flow diagram depicting a procedure in an exemplary implementation of clear rectangles for composite output of one or more video streams.

FIG. 4 depicts a procedure 400 in an exemplary implementation in which clear rectangles are constructed. In discussing FIG. 4, reference will be made to example representation of clear rectangles depicted in FIG. 5A and the example representation of a texture used to implement clear rectangles depicted in FIG. 5B.

Processing to combine video streams into a composite output is initiated (block 402). For example the rendering module 124 of FIG. 1 may be executed to playback media content 112 on the client device 102, such as on the display device 104. In an embodiment, the rendering module 124 may include clear rectangle module 208, as in FIG. 2, to implement aspects of the described clear rectangle techniques. For the purposes of example, the media content 112 may be a high definition television program which is downloaded from a content source 106 and recorded to memory 118 of the client device 102. In another example, the media content 112 may be configured as a movie stored on an optical disk and played back from the media drive 114. Rendering module 124 may operate to composite multiple video streams from the media content 112 into a composite output. The composited video stream may also include menu, text, graphics and other overlays from the media content 112 and/or from other sources, such as a menu or guide streams from the rendering module 124 or from an associated application 120 configured for media playback. To perform the compositing of multiple streams, the rendering module 124 may be configured to initiate various rendering operations and may provide instructions to direct GPU 126 to perform certain operations. Thus, rendering module 124 may be executed to initiate processing related to playback of the television program from memory 118 or to initiate playback of the movie from the media drive 114.

Data defining clear rectangles that are to appear in the composite output is obtained (block 404). For example, in playback of the television program in the preceding example, one or more clear rectangles may be defined, for instance to show main video of the television program through other streams such as a subtitle stream and/or a program guide stream.

In an implementation, attributes defining clear rectangles may be obtained via one or more of the composited content streams. Clear rectangles may be defined by a content author and may be configured by an application 120 which may include media playback functionality, for example the console application 204. The configured clear rectangles may be passed to the rendering module 124 and/or clear rectangle module 208 via the attributes to implement the clear rectangles.

In particular, attributes defining clear rectangles may be attached one or more content streams. In an implementation, the attributes defining clear rectangles for a composite output are associated with the zero z-depth stream, e.g., the main video stream. The attributes may indicate a number of clear rectangles to be included, the maximum z-depth of the set of rectangles, and an array of structures to define each individual clear rectangle. The array of structures may include a structure for each rectangle having the target z-depth and coordinates of the respective rectangle. The attributes defining clear rectangles, and accordingly the defined rectangles, may be changed for each frame of a content stream. Of course, the attributes defining clear rectangles may also remain the same for multiple consecutive frames to maintain a defined arrangement of clear rectangles through the consecutive frames.

Figure 5A:
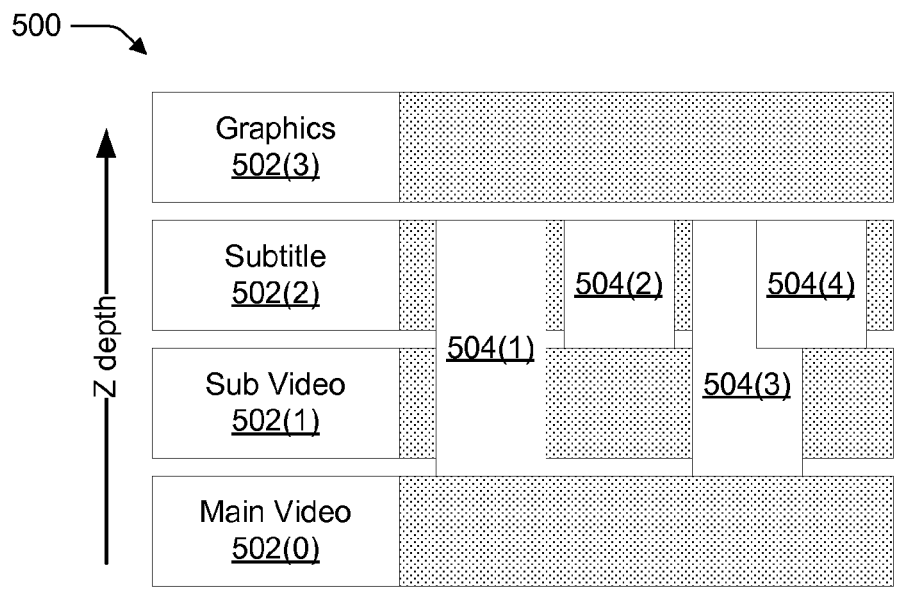
FIG. 5A is an illustration depicting an example representation of clear rectangles.

Referring to FIG. 5A, a diagram 500 depicts an example representation of clear rectangles in a composite output. For example, FIG. 5A shows four video streams which may be composited to form a composite output. An application 120 configured for media playback may direct the rendering module 124 to perform the compositing. The video streams in this example include main video 502(0), sub video 502(1), subtitle 502(2), and graphics 502(3). The numbers within the parentheses in the references numbers for the streams correspond to the respective z-depths of the stream. It is noted that the streams are composited in order of increasing z-depth.

The application 120 may configure four clear rectangles which are shown as clear rectangles 504(1)-504(4) in FIG. 5A. The application 120 specifies that clear rectangles 504(1) and 504(3) span video streams with z-depth of one and two. The application 120 specifies that the clear rectangles 504(2) and 504(4) span only the stream with z-depth of two. In addition, it may be seen that the clear rectangles 504(3) and 504(4) are overlapping.

In this example, the application may attach or otherwise associate attributes to the main video 502(0) stream which defines the clear rectangles. For instance, the associated attributes may indicate that there are four rectangles, the coordinates of each of the four rectangles, and a maximum z-depth of each of the clear rectangles, which is two in the example of FIG. 5A. In addition, attributes may indicate that clear rectangles 504(1) and 504(3) have a target z-depth of one and also indicate that clear rectangles 504(2) and 504(4) have a target z-depth of two. The application 120 may communicate the attributes defining the clear rectangles 504(1)-504(4) to the rendering module 124 and/or clear rectangle module 208. Rendering module 124 and/or clear rectangle module 208 may then use the obtained attributes to implement the clear rectangles 504(1)-504(4).

Referring again to FIG. 4, a texture to represent a union of the clear rectangles is formed (block 406). For instance, to implement clear rectangles 504(1)-504(4) of FIG. 5A, rendering module 124 and/or clear rectangle module 208 of FIG. 2 may form a texture 222. The texture 222 illustrated in FIG. 2 may be representative of various textures including textures used to implement clear rectangles. The texture 222 may be within memory 118 of the game console 202 as depicted in FIG. 2 or in other suitable memory, such as memory 226 of the GPU 126. The texture 222 may be configured as a bitmap representative of the union of the clear rectangles 504(1)-504(4).

More particularly, when clear rectangle is enabled for the first time, or when the number or dimensions of clear rectangles for a composite output change, a rectangular texture may be formed and stored in memory, such as the texture 222 in FIG. 2. The texture that is formed may use a one byte per pixel linear format that represents the union of each of the clear rectangles. The first time clear rectangle is enabled, the texture may be initialized so that each byte has the sentinel value. When clear rectangles have previously been configured, the clear rectangles are removed from the texture by setting each byte of memory in the texture corresponding to the clear rectangles to the sentinel value. In an implementation, the sentinel value may be set to 255. The sentinel value may represent an upper bound on the z-depth. For instance, when the value is 255, the texture may support clear rectangles for up to 255 streams (e.g., z-depth from 0 to 254). Other sentinel values may also be employed with the clear rectangle techniques without departing from the spirit and scope thereof.

In an implementation, each of the defined clear rectangles is processed in order from highest target z-depth to lowest target z-depth to set-up the texture. This ensures that if two or more clear rectangles overlap, the transparency will extend to the lowest z-depth in the overlapping region. To process each clear rectangle, each byte of memory in the texture corresponding to the area within the clear rectangle is set to the value of the clear rectangle's target z-depth. The sentinel value is retained in each byte of memory in the texture that does not correspond to clear rectangles. The result is a texture representing the union of the defined clear rectangles. In particular, the texture may be formed to include the lowest z-depth of clear rectangles in areas of the texture which are to have clear rectangles and the sentinel value in the remaining areas of the texture. Once the clear rectangle texture is set up, it may be used during video processing to determine whether to make pixels for each stream transparent.

Figure 5B:
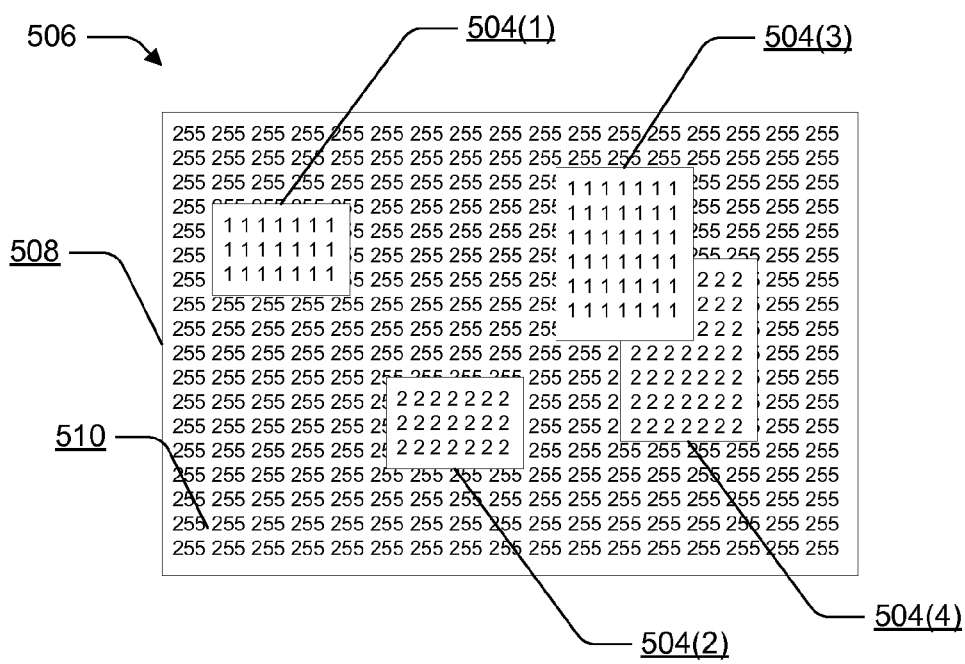
FIG. 5B is an illustration depicting an example representation of a texture to implement clear rectangles.

Referring to FIG. 5B, a diagram 506 depicts an example representation of a texture 508 to implement the clear rectangles of FIG. 5A. It may be seen that the sentinel value, in this example 255, is included in regions 510 of the texture 508 which do not correspond to clear rectangles 504(1)-504(4) of FIG. 5A. Regions of texture 508 that correspond to the clear rectangles 504(1)-504(4) are labeled accordingly. These regions contain the target z-depth of respective rectangles. For example, the region of the texture 508 corresponding to clear rectangle 504(1) has the value of one. In the area of overlapping, the lowest target z-depth is contained in the texture 508. For example, the region of the texture 508 corresponding to the overlap of clear rectangles 504(3) and 504(4) has the value of one, which is the lower target z-depth of clear rectangle 504(3).

Referring again to FIG. 4, the texture is applied on a pixel-by-pixel basis to the video streams to form the clear rectangles in the composite output (block 408). For instance, the texture 508 of FIG. 5B may be applied to implement clear rectangles 504(1)-504(4) of FIG. 5A. For example, the rendering module 124 and/or clear rectangle module 208 may provide the texture 508 and processing instructions to cause the GPU 126 to apply the texture. Additional discussion of processing techniques to apply a texture to implement clear rectangles may be found in relation to procedure 600 of FIG. 6.

The composite output having the resultant clear rectangles is provided for display (block 410). For example, when the texture 508 has been applied by the GPU 126, the composite output formed may be returned to the application 120 for display. For instance, the rendering module 124 may cause a frame of composite output to which the texture 508 has been applied to be written into a desktop 224 memory surface which may be output via the display interface 128 on the display device 104. The frame of composite output is configured to include the clear rectangles 504(1)-504(4) of the preceding examples.

The rendering module 124 and/or GPU 126 may apply the texture 508 successively to frames of the composite output until a change is made to the clear rectangles. Accordingly, monitoring may be performed to detect a change in the clear rectangles (block 412). The changes in the clear rectangles may be determined through monitoring of the attributes defining the clear rectangles. When a change is detected, the procedure 400 may return to block 406 where a new texture may be formed to represent the changed rectangles. When no change is detected, the procedure 400 may return to block 408 where rendering module 124 and/or GPU 126 may continue to apply the previously formed texture.

Figure 6:
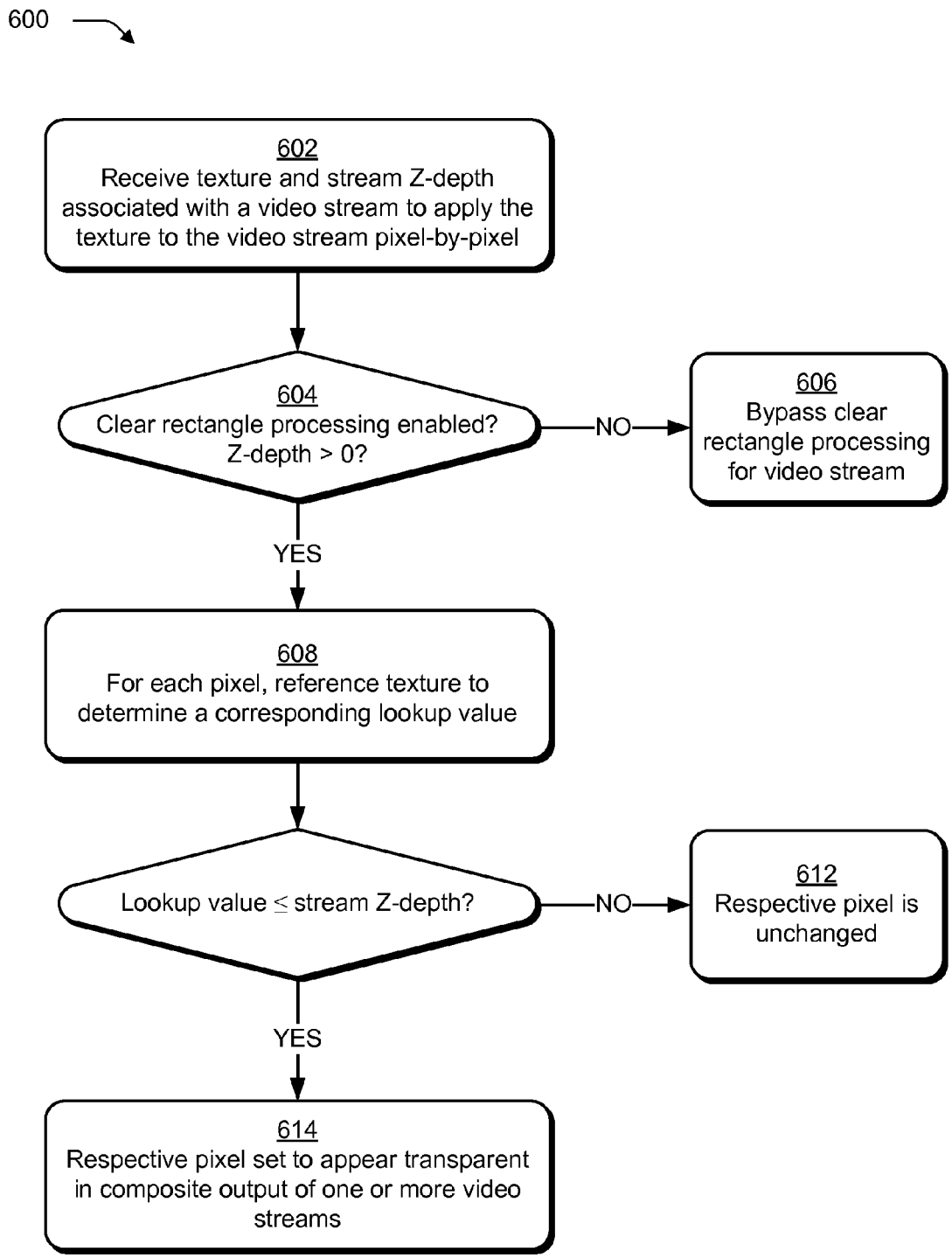
FIG. 6 is a flow diagram depicting a procedure in an exemplary implementation in which a texture is applied to form clear rectangles in a composite output of one or more video streams.

FIG. 6 depicts a procedure 600 in an exemplary implementation in which a texture is applied to form clear rectangles in a composite output of one or more video streams. A texture and stream Z-depth associated with a video stream is received to apply the texture to the video stream pixel-by-pixel (block 602). For instance, rendering module 124 of FIG. 2 may operate to pass a texture which is formed in accordance with procedure 400 of FIG. 4, such as texture 508, to GPU 126 to apply the texture to a video stream for a composite output. Rendering module 124 may also pass the z-depth of the stream and processing instructions to the GPU 126. The GPU 126 and/or particular pixel shader 230 of the GPU may execute the instructions to apply the texture to the video stream.

A determination is made as to whether clear rectangle processing is enabled for the video stream (block 604). In an implementation, the determination may involve determining if the z-depth associated with a video stream is greater than zero. When clear rectangle is not enabled, clear rectangle processing is bypassed for the video stream (block 606).

For instance, during video processing, the video frames for each content stream are composited on top of the main video stream in order of increasing z-depth. In order to determine whether clear rectangle is enabled for a particular video stream, the maximum clear rectangle z-depth is compared to the video stream's z-depth. The rendering module 124 may be executed to make this comparison. If the stream's z-depth is less than or equal to the maximum clear rectangle z-depth, then clear rectangle is enabled for that stream, and the GPU and/or pixel shader 230 may be instructed to handle the transparency test for each pixel. When clear rectangle is enabled for the video stream, then both the previously configured texture and the z-depth of the video stream may be passed in to the pixel shader 230 for processing. Otherwise, a value of zero is associated with the stream and passed in as the stream's z-depth. This tells the GPU and/or pixel shader 230 to bypass the clear rectangle processing.

When clear rectangle is enabled, the GPU and/or pixel shader 230 are executed to perform operations to apply the texture. The pixel shader 230 may execute once for each pixel. The pixel shader 230 determines whether the pixel is within a clear rectangle and if so makes the pixel transparent.

In particular, for each pixel, the texture is referenced to determine a corresponding lookup value (block 608). For example, the texture lookup may use the normalized screen coordinates of the pixel that is currently being processed to obtain a corresponding value from the texture. For example, a lookup may be performed on a texture 222 stored on game console 202 of FIG. 2. The texture 222 may be configured in accordance with the techniques discussed with respect to FIG. 4 and the example texture 508 of FIG. 5B. The lookup will determine the lowest z-depth of each clear rectangle that overlaps the pixel. In areas where there are no clear rectangles, the lookup will return the sentinel value.

A determination is made whether the value from the lookup is less than or equal to the stream's z-depth (block 610). The determination assesses whether the pixel being processed is within a clear rectangle and accordingly is to be made transparent. If the result of the texture lookup is greater than the streams z-depth, then the pixel is outside the clear rectangle and the transparency of the pixel is not changed (block 612). If the result of the texture lookup is less than or equal to the stream's z-depth, then the pixel is determined to be within a clear rectangle, and is made transparent (block 614). For instance, pixel shader 230 may set an alpha channel of the pixel to zero to make the pixel transparent. It is noted that the sentinel value used for areas in the texture outside of clear rectangle regions may be selected so that the value is greater than the number of possible streams. In this way, when the sentinel value is returned in the texture lookup it will be greater than the highest possible stream z-depth.

Image Capture:

Image capture allows a snapshot to be taken, in bitmap form, of the current video frame from the main video stream. In an implementation, the capture is done after video processing has been performed (such as scaling, color conversion, brightness/contrast adjustments), but before sub-streams have been composited on top of the main video. In addition, letterboxing or pillar boxing is removed from the final captured image. In traditional techniques, captured image contained the fully composited image including sub-titles and graphics.

Image capture may be implemented via the rendering module 124 described herein. In an embodiment, rendering module 124 includes a capture module 210 as illustrated in FIG. 2 to implement image capture techniques. The capture module 210 may incorporate a capture interface off of a video mixer of the rendering module 124 used to composite content streams into a composite output.

In operation, an application 120, such as the console application 204 or another application 120 to provide interaction with media content 112 may allocate a capture buffer. For example, capture buffer may be arranged in a portion of memory 118 accessible to the application 120 and the processor 116 on which the application is executed. In other words the capture buffer may be in system memory. The application 120 may then call into the interface of the capture module 210 to fill the buffer with a snapshot of the main video stream post-video processing and before compositing sub-streams. When the interface is invoked, the rendering module 124 may set a flag in the video mixer notifying it to perform an image capture. Rendering module may also pause or block the application's thread to permit the image capture to be completed.

To composite multiple content streams, the rendering module 124 may call into a video processor (e.g., GPU 126) once for each content stream in order from lowest to highest z-depth. The GPU 126 performs processing under the influence of the rendering module 124 to composite the streams onto a back buffer, which may be allocated in memory 226 of the GPU 126. In an implementation, access to the back buffer may be restricted to the GPU 126. Thus, the application 120 may not be able to directly copy the back buffer to the capture buffer. Instead the back buffer may be resolved to a texture which is accessible to both the GPU 126 and the system (e.g., application 120 and processor 116), such as the example texture 222 depicted in FIG. 2.

The image may be copied to the texture and then to the capture buffer. In an implementation, a texture of a certain size is allocated and the image in the back buffer is resolved as a plurality of strips that fit into the texture. The texture size used may be smaller than the size of the entire image. Thus, resolving the back buffer into strips may reduce the size of memory consumed by the texture and accordingly, the amount of memory which may be provided with a client device 102 or game console 202 to support image capture.

Figure 7:
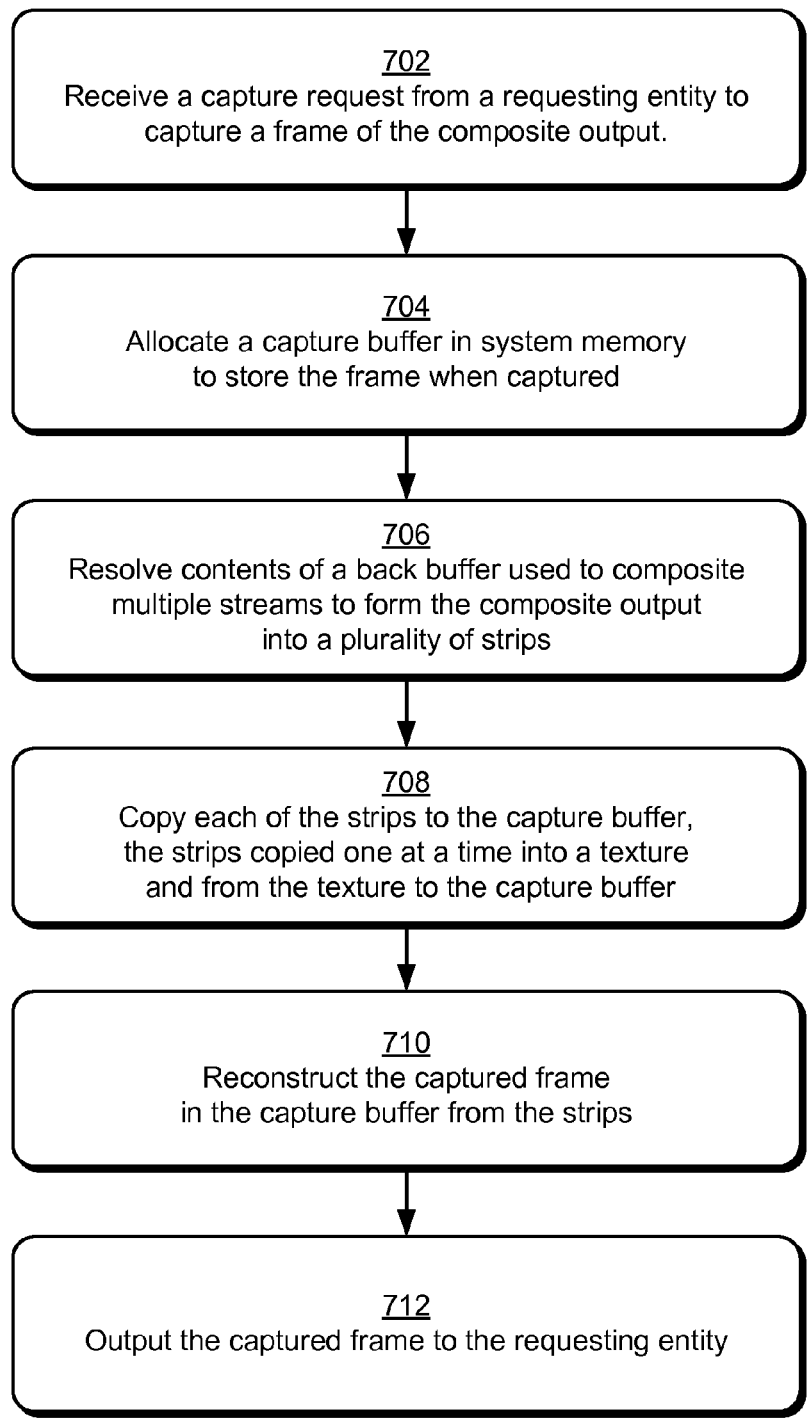
FIG. 7 is a flow diagram depicting a procedure in an exemplary implementation in which an image is captured by resolving strips of the image into a texture to copy the image to a capture buffer of system memory.

FIG. 7 is a flow diagram depicting a procedure 700 in an exemplary implementation in which an image is captured by resolving strips of the image into a texture to copy the image to a capture buffer of system memory.

A capture request is received from a requesting entity to capture a frame of the composite output (block 702). For example, a user watching a movie played back using the media drive 114 of on the game console 202 of FIG. 2, may manipulate the input device 232 to cause a capture request to be provided via the console application 204 or another application 120 configured to playback the movie. Console application 204 may communicate the request to the capture module 210 to initiate the image capture.

A capture buffer is allocated in system memory to store the frame when captured (block 704). In the preceding example, console application 204 may allocate a capture buffer in system memory 118 responsive to receiving the capture request from the user. In another example, the capture module 210 may be configured to allocate a capture buffer when the request is processed.

Contents of a back buffer used to composite multiple streams to form the composite output are resolved into a plurality of strips (block 706). Each of the strips is copied to the capture buffer, the strips being copied one at a time into a texture and from the texture the capture buffer (block 708). For example, when the capture request is received, then capture module 210 may operate to capture an image of the main video stream from a back buffer used to composite the one or more video streams into the composite output. The contents of the back buffer may be captured after processing the main video stream. This allows the captured image to reflect each video processing step that was done on the main video stream.

In order to reduce memory usage by the image capture operation, a relatively small texture is used as noted above. The image in the back buffer is resolved in strips from top to bottom until the entire desired image is copied to the texture. Access to the back buffer may be restricted to GPU 126, thus the texture is established in memory available to the GPU 126 and an application 120 employed to copy the image to the capture buffer. Each strip is copied to the texture and then from the texture to the capture buffer system memory.

In an implementation, the GPU 126 under the influence of the capture module 210 may be executed to successively copy strips of back buffer to the texture. Capture module 210 may operate to copy strips from the texture to the capture buffer. Thus, GPU 126 may fill the texture with one of the strips. Capture module 210 copies the one strip from the texture to the capture buffer. The GPU 126 fills the texture with another strip. Capture module 210 copies this other strip to the capture buffer and so on, until the entire image is copied to the capture buffer.

The texture may be as wide as the back buffer and an interval of the height. For example, to capture a high definition image having a resolution of 1920 pixels by 1080 pixels, a texture may be set to the width of the back buffer, which in this example would be 1920 pixels. The height of the texture may be selected to balance processing speed, performance and memory usage and to optimize the image capture. For instance, a texture may be used which is 64 pixels high. At 4 bytes per pixel, this results in a texture that is 480 KB compared to about 8 MB if a single texture (1920 pixels by 1080 pixels) was used to resolve the entire back buffer at once. It is contemplated that various texture sizes may be used with the described image capture techniques without departing from the spirit and scope thereof.

The captured frame is reconstructed in the capture buffer from the strips (block 710). For example, when each strip of the back buffer is copied to the capture buffer, the entire image is in the capture buffer. Once the entire image has been copied, the application's thread is signaled and may perform additional processing to format, reconstruct or otherwise process the captured image. For example, the console application 204 (or other application 120) may perform a color conversion to convert the captured image data from a color space of the back buffer to a suitable color space for output. The color conversion may be performed by the application 120 rather than the GPU 126 to prevent overburdening of the GPU 126. In an implementation, the back buffer may be YCbCr color space, such as YCbCr_709, or YCbCr_601. Thus, image data maybe converted from YCbCr to an RGB color space or other color space suitable for the game console 202 and/or a display device 104. Then, the captured image is output to the requesting entity (block 712). For example, the captured image may be stored as an image file in memory 118, output to the user via the console application 204 on the display device 104, and so forth.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computing device comprising:
   a graphics processing unit (GPU); and
   one or more modules executable to perform luma keying operations to render media content including one or more video streams by the computing device including:
   compositing one or more video streams to form a frame of the media content; and
   for each pixel of the one or more video streams in the frame, instructing the GPU to perform processing operations to:
      subtract an upper luma threshold from a luma value of the pixel to obtain a first value;
      subtract the luma value of the pixel from a lower luma threshold to obtain a second value;
      determine a maximum value from the first value and the second value; and
      when the maximum value is less than zero, set the pixel as transparent.

2. The computing device as recited in claim 1, wherein:
   when the maximum value is greater than or equal to zero, the luma value of the pixel remains unchanged; and
   when the maximum value is less than zero, the pixel is set as transparent using the luma value of the pixel.

3. The computing device as recited in claim 1, wherein the computing device is configured as a game console.

4. The computing device as recited in claim 1, wherein the graphic processing unit (GPU) includes a pixel shader component to perform the processing operations for each pixel.

5. The computing device as recited in claim 1, wherein the graphics processing unit (GPU) is operated to perform the processing operations under influence of a rendering module of the computing device.

6. The computing device as recited in claim 1, wherein:
   the computing device is configured as a game console;
   the graphics processing unit (GPU) includes a pixel shader to perform the processing operations;
   the GPU is operated under influence of a rendering module of the game console; and
   the rendering module is incorporated in a console application of the game console.

7. The computing device as recited in claim 1, wherein:
   the graphics processing unit (GPU) is operated to perform the processing operations under influence of a rendering module of the computing device; and
   the rendering module is a component of a media playback application of the computing device configured to output high definition media content from a high definition media source.

8. The computing device as recited in claim 1, wherein:
   the computing device includes a rendering module as a component of an operating system of the computing device; and
   the rendering module is configured to perform the compositing and the instructing to output high definition media content from a high definition media source for display on a display device associated with the computing device.

9. A method implemented by a computing device to capture frames of a high definition video output comprising:
   initiating processing to combine video streams into a composite output, the processing including successively compositing the video streams into a back buffer of a graphics processing unit (GPU) of the computing device to form each frame of the composite output;
   receiving a capture request from a requesting entity to capture a frame of the composite output;
   allocating a capture buffer in the memory to store the frame;
   resolving contents of the back buffer into a plurality of strips after processing of a main said video stream and before compositing other said video streams in the back buffer;
   transferring each said strip, one at a time, into a texture and copying the each said strip from the texture to the capture buffer to form a captured frame; and
   outputting the captured frame to the requesting entity.

10. The method as recited in claim 9, wherein:
    access to the back buffer is restricted to the graphics processing unit (GPU);
    the texture is accessible to the GPU and a capture module implemented via the computing device;
    the GPU operates under influence of the capture module to transfer the plurality of strips into the texture; and
    the capture module operates to copy the plurality of strips from the texture to the capture buffer.

11. The method as recited in claim 9, wherein the texture is sized to hold a single said strip, one at a time, such that the single said strip is copied from the texture to the capture buffer before another said strip is transferred to the texture.

12. The method as recited in claim 9 further comprising performing luma keying operations to render media content including one or more video streams including, for each pixel of a frame, instructing the graphics processing unit (GPU) of the game console to:
- subtract an upper luma threshold from a luma value of the pixel to obtain a first value;
- subtract the luma value of the pixel from a lower luma threshold to obtain a second value;
- determine a maximum value as the greater of the first value and the second value; and
- when the maximum value is less than zero, set the luma value to make the pixel transparent in the frame.

13. A method as recited in claim 9 further comprising:
receiving data describing one or more clear rectangles to include in the composite output;
forming another texture to represent a union of the one or more clear rectangles; and
instructing the graphics processing unit (GPU) to apply the other texture on a pixel-by-pixel basis to the video streams to form the clear rectangles in the composite output of the video streams.

14. The method as recited in claim 9, wherein the computing device comprises a game console.

15. One or more computer-readable storage devices storing computer-executable instructions thereon that, when executed by a computing device, implement a rendering module configured to perform capture operations to capture frames of a high definition video output including:
- initiating processing to combine video streams into a composite output, the processing including successively compositing the video streams into a back buffer of a graphics processing unit (GPU) of the computing device to form each frame of the composite output;
- receiving a capture request from a requesting entity to capture a frame of the composite output;
- allocating a capture buffer in the memory to store the frame;
- resolving contents of the back buffer into a plurality of strips after processing of a main said video stream and before compositing other said video streams in the back buffer;
- transferring each said strip, one at a time, into a texture and copying the each said strip from the texture to the capture buffer to form a captured frame; and
- outputting the captured frame to the requesting entity.

16. One or more computer-readable storage devices as recited in claim 15, wherein:
- access to the back buffer is restricted to the graphics processing unit (GPU);
- the texture is accessible to the GPU and the rendering module;
- the GPU operates under influence of the rendering module to transfer the plurality of strips into the texture; and
- the rendering module operates to copy the plurality of strips from the texture to the capture buffer.

17. One or more computer-readable storage devices in claim 15, wherein the texture is sized to hold a single said strip, one at a time, such that the single said strip is copied from the texture to the capture buffer before another said strip is transferred to the texture.

18. One or more computer-readable storage devices as recited in claim 15 further comprising computer-executable instructions to perform luma keying operations to render media content including one or more video streams including, for each pixel of a frame, instructing the graphics processing unit (GPU) to:
- subtract an upper luma threshold from a luma value of the pixel to obtain a first value;
- subtract the luma value of the pixel from a lower luma threshold to obtain a second value;
- determine a maximum value as the greater of the first value and the second value; and
- when the maximum value is less than zero, set the luma value to make the pixel transparent in the frame.

19. One or more computer-readable storage devices as recited in claim 15 further comprising computer-executable instructions to generate clear rectangles for the high definition media output including:
- receiving data describing one or more clear rectangles to include in the composite output;
- forming another texture to represent a union of the one or more clear rectangles; and
- instructing the graphics processing unit (GPU) to apply the other texture on a pixel-by-pixel basis to the video streams to form the clear rectangles in the composite output of the video streams.

20. One or more computer-readable storage devices as recited in claim 15 further comprising computer-executable instructions for processing each strip to perform a color conversion to convert the captured image data from a color space of the back buffer to a color space for output of the captured image to the requesting entity.

* * * * *